United States Patent
Pastorello

(10) Patent No.: US 6,760,854 B2
(45) Date of Patent: Jul. 6, 2004

(54) METHOD AND APPARATUS FOR HANDLING A FRAMING ERROR AT A SERIAL INTERFACE BY FORCING INVALID COMMANDS TO BE READ UPON DETERMINE THE COMMAND IS INVALID

(75) Inventor: Douglas F. Pastorello, Hudson, NH (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 10/424,397

(22) Filed: Apr. 28, 2003

(65) Prior Publication Data

US 2003/0196130 A1 Oct. 16, 2003

Related U.S. Application Data

(63) Continuation of application No. 09/483,819, filed on Jan. 15, 2000.

(51) Int. Cl.[7] ............................. G06F 1/12; G06F 7/00
(52) U.S. Cl. ....................... 713/400; 713/500; 713/502; 713/60
(58) Field of Search ................................ 713/400, 600, 713/500, 502; 714/43, 44, 48, 49; 710/105, 107, 110

(56) References Cited

U.S. PATENT DOCUMENTS

| 4,396,995 A | * | 8/1983 | Grau ............................ 714/49 |
| 4,602,327 A | * | 7/1986 | LaViolette et al. ......... 710/107 |
| 5,016,162 A | | 5/1991 | Epstein et al. |
| 5,428,645 A | | 6/1995 | Dolev et al. |
| 5,440,746 A | | 8/1995 | Lentz |
| 5,680,537 A | | 10/1997 | Byers et al. |
| 5,818,885 A | | 10/1998 | Kim |
| 5,845,239 A | | 12/1998 | Laczko, Sr. et al. |
| 6,028,675 A | * | 2/2000 | Fields et al. ................... 714/44 |
| 6,061,822 A | | 5/2000 | Meyer |
| 6,434,612 B1 | | 8/2002 | Hughes et al. |
| 6,470,458 B1 | | 10/2002 | Dreps et al. |

FOREIGN PATENT DOCUMENTS

| JP | 02003850 A | | 1/1990 | |
| JP | 09179793 A | * | 7/1997 | ........... G06F/13/00 |

OTHER PUBLICATIONS

Casale et al., "An efficient synchronization method for dual bus networks", Global Telecom. Conf., 1989, and Exhibition. 'Communications Technology for the 1990s and Beyond'. GLOBECOM '89., IEEE , Nov. 27–30, 1989, Page(s): 548–553 vol. 1.*

* cited by examiner

Primary Examiner—Thomas Lee
Assistant Examiner—James K. Trujillo
(74) Attorney, Agent, or Firm—Steven Lin, Esq.

(57) ABSTRACT

Byte synchronization between a bus master and a serial interface or other bus slave is maintained and promptly corrected by using a unique signal, issued by the serial interface, to promptly and unambiguously notify the bus master of a loss of synchronization, followed by prompt resynchronization by the bus master. The serial interface sets a selected indicium in a status register equal to a selected value, when an invalid command is sensed at the interface. The bus master reads the status register and, when the selected indicium has the selected value, promptly resynchronizes the serial interface without further delay.

16 Claims, 3 Drawing Sheets

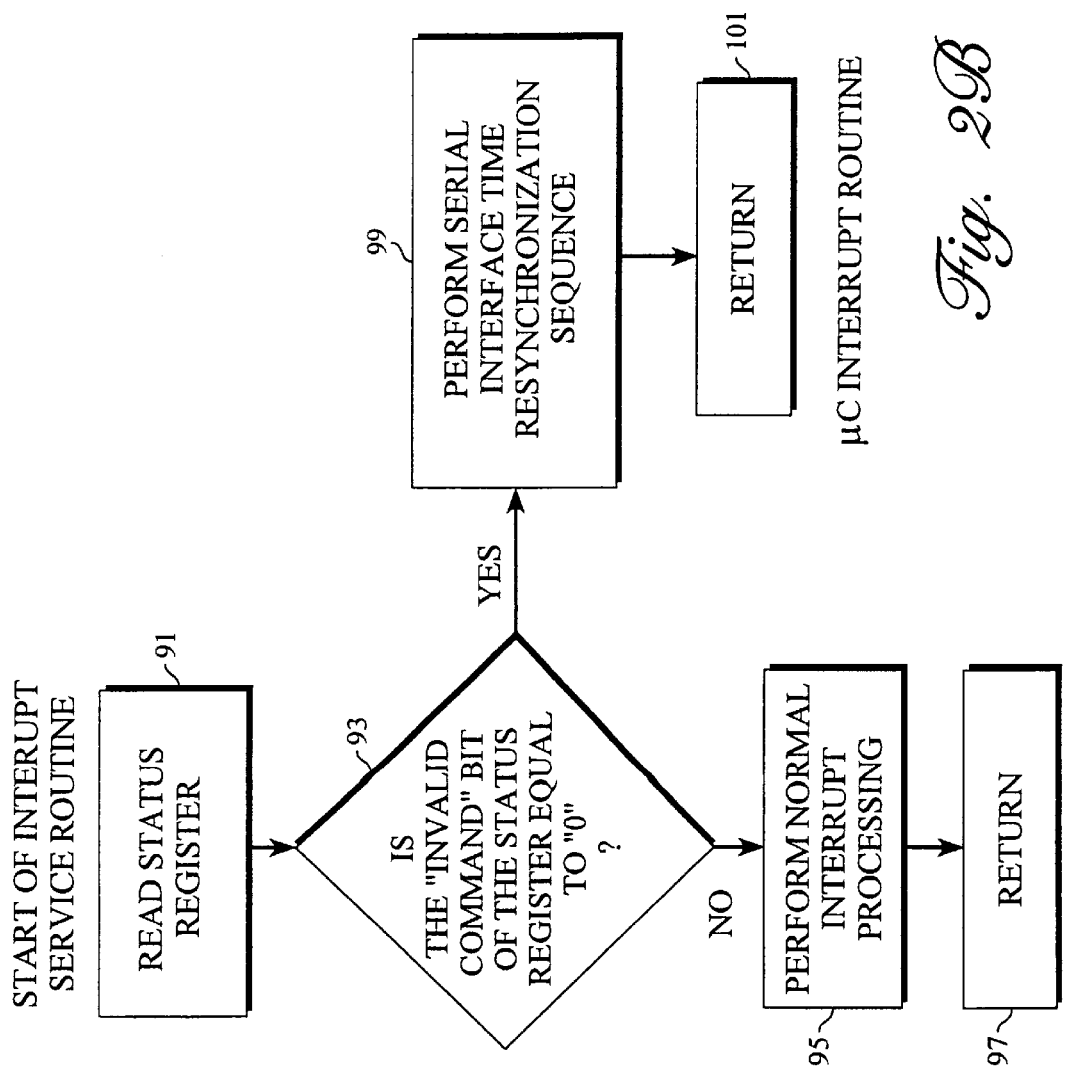
Fig. 2B  μC INTERRUPT ROUTINE

METHOD AND APPARATUS FOR HANDLING A FRAMING ERROR AT A SERIAL INTERFACE BY FORCING INVALID COMMANDS TO BE READ UPON DETERMINE THE COMMAND IS INVALID

This application is a continuation of Ser. No. 09/483,819 filed Jan. 15, 2000.

BACKGROUND OF THE INVENTION

1. Field of the Invention

This invention relates to enhancing time resynchronization at a integrated circuit serial interface.

2. Description of the Related Art

Timing of clock pulses received at a serial port or interface may, from time to time, lose synchronization with the timing of clock pulses received or generated at a microprocessor with which the interface is associated. When time synchronization is lost at an interface, the controller often does not become promptly aware of this loss, with the result that the interface operates without synchronization to the remainder of the system for many cycles. Where timing differences of one or more cycles are critical and synchronization is lost at an interface, the system controller may refuse to recognize or respond to signals from such an interface.

What is needed is an approach that promptly allows the serial interface to advise the microprocessor if the interface timing is not synchronized to the microprocessor timing, and to allow the microprocessor to promptly resynchronize the timing of the interface, if resynchronization is needed. Preferably, the approach should facilitate timing resynchronization, if desired, after each command is received by the serial interface.

SUMMARY OF THE INVENTION

These needs are met by the invention, which uses an input serial interface and an output serial interface, whose operations are synchronized, to perform certain operations in tandem and to thus achieve some of the benefits of a parallel port or interface, such as faster processing of groups of bits representing a digital signal. In one embodiment, each time, or at selected times, the serial interface receives a command, the interface determines whether the command is a valid command, by comparing the bit pattern provided by the microprocessor with the bit patterns understood by the serial interface itself. If the received command is not a valid command, because the bit pattern does not match at least one stored template, the serial interface communicates a unique signal indicating that this mismatch has occurred to the microprocessor, which then issues a Timing Resynchronization command to the serial interface.

BRIEF DESCRIPTION OF THE DRAWING

FIGS. 2A and 2B are a flow chart of a procedure that can be used to practice an embodiment of the invention for resynchronization.

DESCRIPTION OF BEST MODES OF THE INVENTION

Figure 1:
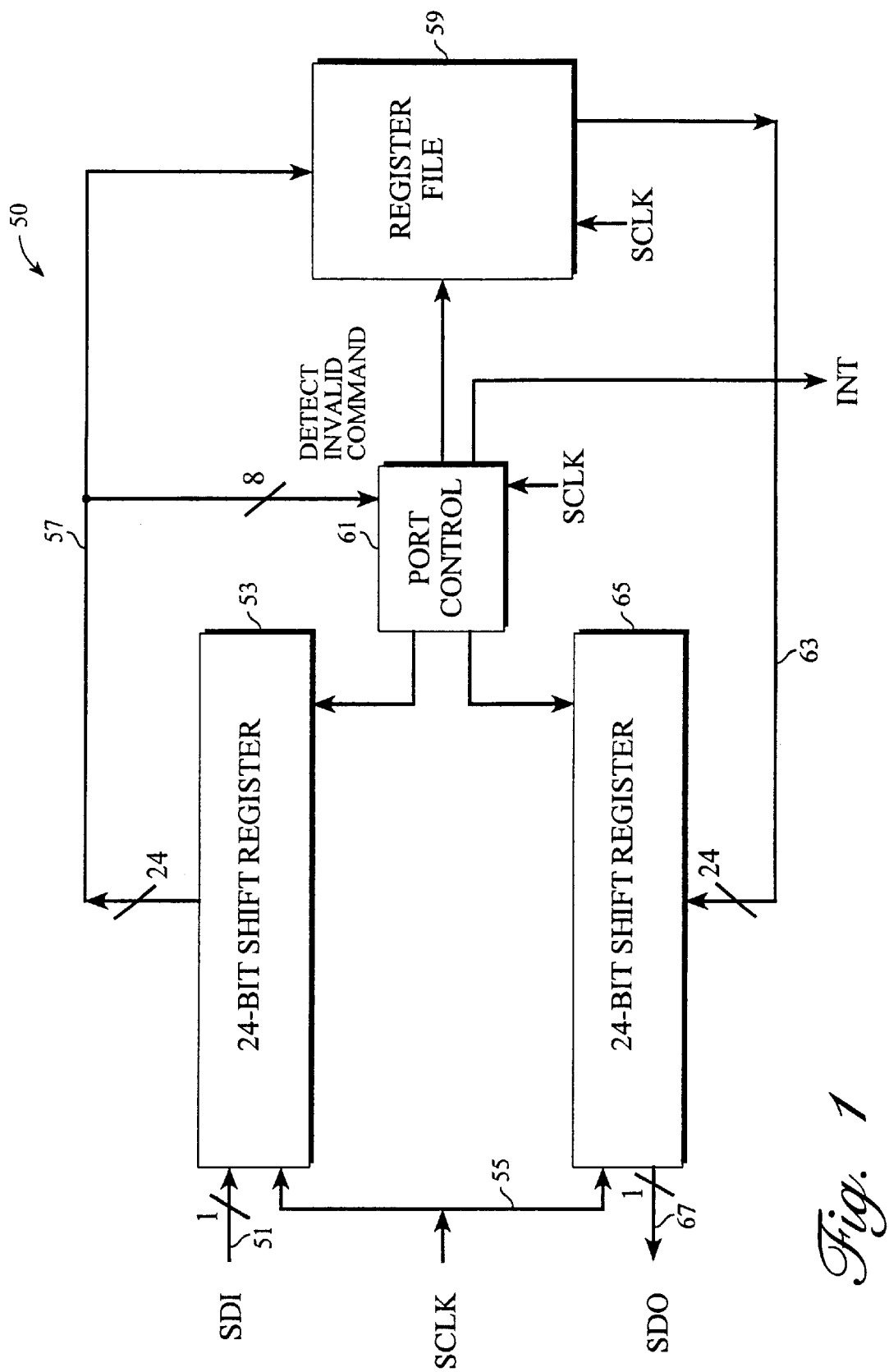
FIG. 1 is a schematic view of apparatus that may be used to practice the invention for resychronization.

With reference to FIG. 1, there is shown a schematic view of apparatus 50 configured to practice the invention. A signal in the form of a one-bit stream arrives on an input signal line 51 and is received by a first 24-bit shift register 53 that is driven by a timer signal SCLK received on a timer signal line 55 from a serial interface timer (not shown). The input signal line 51 and the first shift register 53 serve as part of a first communication channel SDI. Approximately once every 24 timer pulses, or more often or less often if desired, the contents of the first shift register 53 are shifted from the first shift register 53, preferably as a parallel stream, on a 24-bit first intermediate signal transfer line 57 to a register file 59 that holds these 24 bits until these data are needed. The register file 59 is also driven by the timer signal SCLK.

At appropriate times, the register file receives a "transfer Data" command from a port control module 61, also driven or synchronized by the timer signal SCLK, and transfers the 24 bits of data, preferably as a parallel stream, on a second intermediate signal transfer line 63 from the register file 59 to a second 24-bit shift register 65 that is also driven by the timer signal SCLK. When the second shift register 65 is filled with data and/or receives an appropriate command from the port control module 61, the 24 bits are transferred out on a one-bit output signal line 67. The second shift register 65 and output signal line 67 serve as part of a second communication channel SDO. A signal represented by 24 data bits can be transferred through the apparatus (input signal line 51 to output signal line 67) in approximately 24+8+24+8=64 timer pulses. Any reasonable size of a multi-data unit, such as 4 bits, 6 bits, 8 bits, 12 bits, 16 bits, 18 bits, 20 bits, 24 bits, 28 bits, 30 bits, 32 bits, etc., can be used for the first and second shift registers 53 and 65 and for the first and second intermediate signal transfer lines 57 and 63.

In a chip serial port or interface, data are interpreted on byte boundaries, and commands and data are packaged and transferred in groups of bytes. Each data bit is interpreted at a specified time relative to a serial timer signal, SCLK. Commands are issued by a bus master, which normally creates the timer signal, and are processed by bus slaves, including a serial interface. If an unexpected SCLK transition occurs (for example, a noise spike or a shift in the expected SCLK transition time), a bus slave can lose its synchronization with the bus master and can require resynchronization. A bit stream that is out of synch is no longer framed properly and cannot be processed correctly. Once a framing error has occurred, the integrity of the master-slave communication channel is compromised.

Presence of a framing error can be inferred when a bus slave receives an invalid command, as discussed in U.S. Pat. No. 5,886,658, issued to Amar et al, incorporated herein by reference. Use of a sparse instruction set with a relatively small number of commands improves the probability that an out-of-synch condition can be detected. In many prior art approaches, when a timing error condition is detected, the serial interface or other bus slave enters a locked state to protect the integrity of, and values held in, the registers, and an output signal, such as SDO, is tied to '0'. Eventually, persistence of this '0' state will be recognized as presence of a framing error state, but substantial time may pass before this occurs.

Another embodiment of the invention allows for faster and more specific communication or notification of the presence of a framing error state to the bus master. In this embodiment, an interrupt pin, INT, an associated signal is added to the device. The INT pin becomes active when specified internal conditions, such as overflow, invalid command (IC) and framing error, are present at the bus slave. An INT signal generated at the bus slave is preferably received by an interrupt pin at the bus master. When the INT signal becomes active at the bus slave, the bus master will preferably (and promptly) jump to an interrupt processing state to determine the cause or causes of the interrupt signal. Determination of this cause(s) will require receipt of additional information.

A status register is provided, according to the invention, to report the cause of the interrupt signal. The first response of the bus master is to read the status register to determine, or to reduce the number of possible causes of, receipt of the interrupt signal. One problem here is that the bus master cannot reliably request and receive the contents of the status register from the bus slave. The signaling system must be adjusted to ensure that, no matter what command the bus master issues, the bus slave can respond with data that will unambiguously indicate the presence of a framing error, whether or not the bus master has requested the contents of the status register.

This response feature is implemented by making the IC bit of the status register active-low, while all other bits of the status register are active-high. In the presence of a framing error, all data read by the bus master have the value 0, including the (active) IC bit of the status register, from the point of view of the bus master. The bus master thus promptly determines that the bus slave has received an invalid command. At this point, the bus master issues a bus slave Resynchronization command, and the bus slave is promptly resynchronized to the microprocessor timing signals. Alternatively, it is also possible to detect the presence of a framing error by polling the status register at approximately periodic intervals, again with prompt resynchronization to the bus master timer preferred.

Figure 2A:
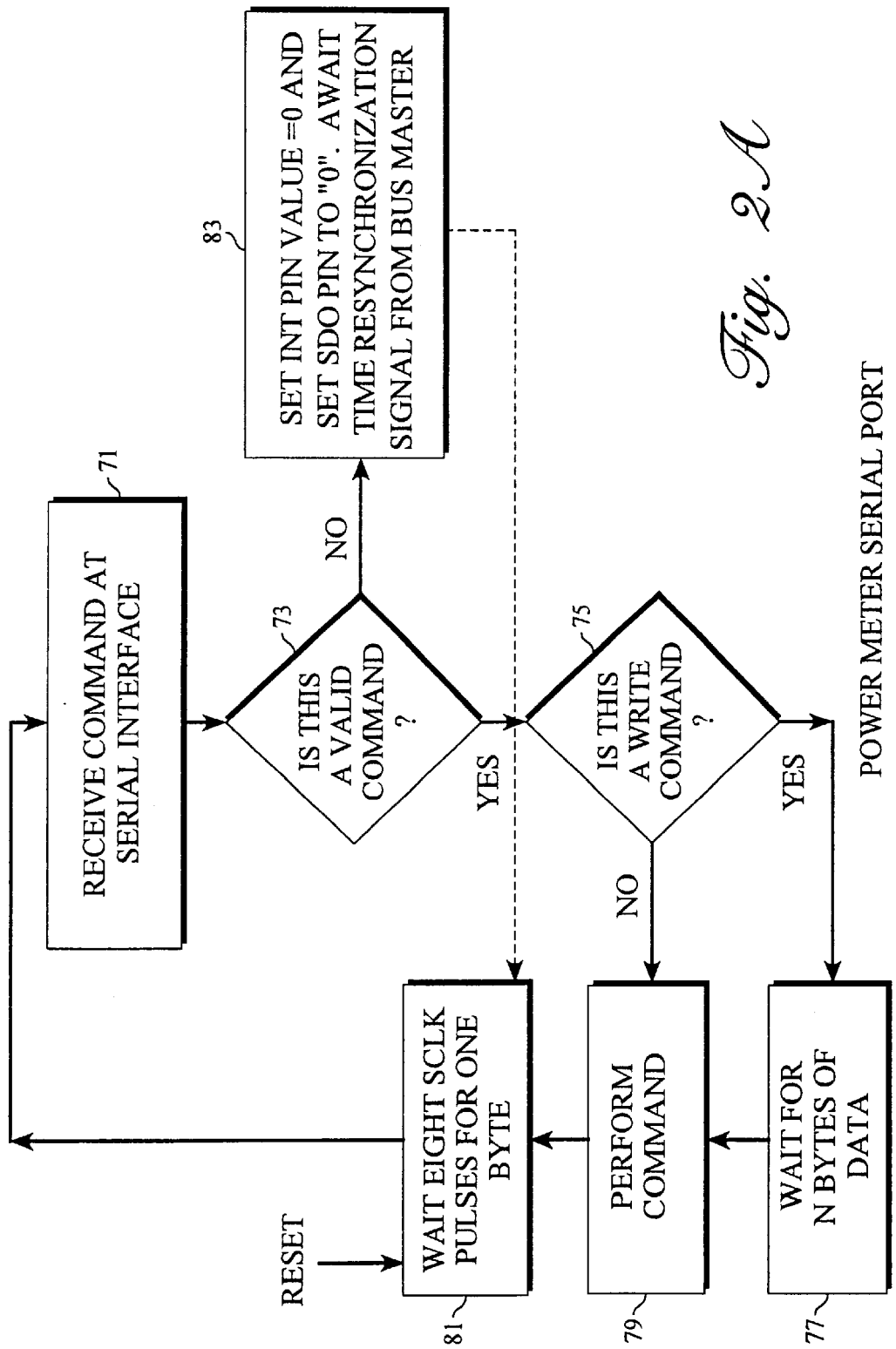

FIGS. 2A and 2B provide a flow chart of the embodiment involving detection of loss of byte synchronization (i.e., framing error), at a serial interface and at a bus master, respectively. In FIG. 2A, a serial interface experiences a reset and waits eight SCLK pulses, at step 81. The interface receives a command, at step 71, and determines, in step 73, whether this command is a valid command. When the answer to the question in step 73 is "yes", the system proceeds to step 75 and determines if the command is a Write command. If the answer to the question in step 75 is "yes", the system moves to step 77 and waits for N bytes of data (to be written), then moves to step 79 to perform this command, on the SDI channel. When the answer to the question in step 75 is "no", the system moves directly to step 79 and performs the command (on the SDI or SDO channel). The system is reset (optional) at step 81 and waits eight timer pulses for the next command byte. When the answer to the question in step 73 is "no", the system sets an associated INT pin value equal to 0 and locks the SDO pin to 0, in step 83, until resynchronization is completed.

In FIG. 2B, the bus master reads the status register in step 91 and determines, in step 93, whether the Invalid Command bit of the status register is set equal to 0. When the answer to the question in step 93 is "no", the system performs normal interrupt processing, in step 95, and returns to its previous task, in step 97. When the answer to the question in step 93 is "yes", the system performs a time resynchronization sequence at the serial interface, in step 99, and returns to its previous task, in step 101.

In the disclosed embodiments, communication between a bus master and a bus slave, such as a serial interface, is arranged so that notification of loss of time synchronization at the bus slave is received and recognized promptly by the bus master, and resynchronization of the bus slave also occurs promptly.

What is claimed is:

1. A method for handling a framing error at a serial interface in an integrated circuit, the method comprising:

receiving a command at a serial interface in an integrated circuit;

determining if the command received at the serial interface is a valid command by comparing a received serial bit pattern for the command with valid serial bit patterns recognizable by the serial interface;

when the command is a valid command since the received serial bit pattern matches one of the valid serial bit patterns, processing the command; and when the command is not a valid command since the received serial bit pattern does not match any one of the valid serial bit patterns, setting an invalid command bit of a status register to a set value, interrupting a bus master, and forcing the bus master to read the set value of the invalid command bit regardless of whether the bus master requested contents of the status register promptly signifying to the bus master that a framing error at the serial interface has occurred.

2. The method according to claim 1, wherein interrupting a bus master further comprises:

using an interrupt signal to interrupt the bus master.

3. The method according to claim 1, further comprising:

when the command is not a valid command, forcing the bus master from its perspective to read a data bit stream as though data of the data bit stream were all zeroes, which further promptly signifies to the bus master that the framing error has occurred.

4. The method according to claim 1, further comprising:

when the command is not a valid command, performing a byte resynchronization sequence of the data bit stream at the serial interface.

5. An apparatus for handling a framing error at a serial interface in an integrated circuit, comprising:

a bus master and an associated status register that is readable by the bus master; and a serial interface in an integrated circuit that receives a command and determines if the received command is a valid command by comparing a received serial bit pattern for the command with valid serial bit patterns recognizable by the serial interface; and wherein:

when the command is a valid command since the received serial bit pattern matches one of the valid serial bit patterns, the command is processed; and when the command is not a valid command since the received serial bit pattern does not match any one of the valid serial bit patterns, an invalid command bit of a status register is set to a set value, the bus master is interrupted, and the bus master is forced to read the set value of the invalid command bit regardless of whether the bus master requested contents of the status register promptly signifying to the bus master that a framing error at the serial interface has occurred.

6. The apparatus according to claim 5, wherein an interrupt signal is used to interrupt the bus master.

7. The apparatus according to claim 5, wherein:

when the command is not a valid command, the bus master from its perspective is forced to read a data bit stream as though data of the data bit stream were all zeroes, which further promptly signifies to the bus master that the framing error has occurred.

8. The apparatus according to claim 5, wherein:
when the command is not a valid command, a byte resynchronization sequence of the data bit stream at the serial interface is performed.

9. A method for promptly notifying a bus master of an occurrence of a framing error at a serial interface, the method comprising:
determining whether a framing error has occurred at a serial interface by comparing a received serial bit pattern for a received command with valid serial bit patterns recognizable by the serial interface;
in response to the occurrence of the framing error at the serial interface since the received serial bit pattern does not match any one of the valid serial bit patterns, activating an invalid command bit of a status register, overriding processes of a bus master, and forcing the bus master to read the activated invalid command bit, which promptly signifies to the bus master that the framing error has occurred.

10. The method according to claim 9,
wherein activating an invalid command bit of a status register further comprises setting the invalid command bit of the status register to a set value;
wherein overriding processes of a bus master further comprises interrupting the bus master; and
wherein forcing the bus master to read the activated invalid command further comprises forcing the bus master to read the set value of the invalid command bit regardless of whether the bus master requested contents of the status register promptly signifying to the bus master that the framing error at the serial interface has occurred.

11. The method according to claim 9, further comprising:
in response to the occurrence of the framing error, forcing the bus master from its perspective to read a data bit stream as though data of the data bit stream were all zeroes, which further promptly signifies to the bus master that the framing error has occurred.

12. The method according to claim 9, further comprising:
in response to the occurrence of the framing error, performing a byte resynchronization sequence of the data bit stream at the serial interface.

13. An apparatus for promptly notifying a bus master of an occurrence of a framing error at a serial interface, comprising:
a bus master and an associated status register that is readable by the bus master; and
a serial interface in an integrated circuit wherein a determination is made as to whether a framing error has occurred at the serial interface by comparing a received serial bit pattern for a received command with valid serial bit patterns recognizable by the serial interface; and
wherein in response to the occurrence of the framing error at the serial interface since the received serial bit pattern does not match any one of the valid serial bit patterns, an invalid command bit of a status register is activated, processes of a bus master are overridden, and the bus master is forced to read the activated invalid command bit, which promptly signifies to the bus master that the framing error has occurred.

14. The apparatus according to claim 13,
wherein the invalid command bit of a status register is activated by setting the invalid command bit of the status register to a set value;
wherein processes of the bus master are overridden by interrupting the bus master; and
wherein the bus master is forced to read the activated invalid command by forcing the bus master to read the set value of the invalid command bit regardless of whether the bus master requested contents of the status register promptly signifying to the bus master that the framing error at the serial interface has occurred.

15. The apparatus according to claim 13, wherein:
in response to the occurrence of the framing error, the bus master from its perspective is forced to read a data bit stream as though data of the data bit stream were all zeroes, which further promptly signifies to the bus master that the framing error has occurred.

16. The apparatus according to claim 13, wherein:
in response to the occurrence of the framing error, a byte resynchronization sequence of the data bit stream at the serial interface is performed.

* * * * *